(12) United States Patent
Awazu

(10) Patent No.: US 8,385,735 B2
(45) Date of Patent: Feb. 26, 2013

(54) ILLUMINATION DEVICE AND METHOD, AND APPARATUS FOR IMAGE TAKING

(75) Inventor: Kouhei Awazu, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 1380 days.

(21) Appl. No.: 12/050,573

(22) Filed: Mar. 18, 2008

(65) Prior Publication Data

US 2008/0232079 A1 Sep. 25, 2008

(30) Foreign Application Priority Data

Mar. 19, 2007 (JP) ................................. 2007-070268

(51) Int. Cl.
*G03B 7/16* (2006.01)
*G03B 7/22* (2006.01)

(52) U.S. Cl. ......... 396/236; 396/225; 396/164; 396/166
(58) Field of Classification Search .................... 396/236
See application file for complete search history.

(56) References Cited

U.S. PATENT DOCUMENTS

| | | | |
|---|---|---|---|
| 6,441,558 B1 * | 8/2002 | Muthu et al. ................. | 315/149 |
| 7,106,378 B2 | 9/2006 | Kawakami | |
| 7,319,298 B2 * | 1/2008 | Jungwirth et al. ............ | 315/307 |
| 7,683,966 B2 * | 3/2010 | Kawakami .................... | 348/371 |
| 7,742,098 B2 * | 6/2010 | Kawakami .................... | 348/371 |
| 8,159,146 B1 * | 4/2012 | Lebens et al. ................. | 315/291 |
| 2008/0130311 A1 * | 6/2008 | Kazakevich ................... | 362/553 |
| 2008/0252197 A1 * | 10/2008 | Li et al. ......................... | 313/502 |
| 2008/0297054 A1 * | 12/2008 | Speier ........................... | 315/152 |
| 2009/0309485 A1 * | 12/2009 | Tamaki et al. ................. | 313/503 |
| 2010/0079059 A1 * | 4/2010 | Roberts et al. ................ | 313/503 |
| 2010/0096993 A1 * | 4/2010 | Ashdown et al. ............. | 315/113 |
| 2010/0109575 A1 * | 5/2010 | Ansems et al. ............... | 315/312 |
| 2010/0259182 A1 * | 10/2010 | Man et al. ..................... | 315/250 |
| 2011/0204805 A1 * | 8/2011 | Li et al. ......................... | 315/210 |

FOREIGN PATENT DOCUMENTS

| | | |
|---|---|---|
| JP | 2002-116481 A | 4/2002 |
| JP | 2005-121872 A | 5/2005 |
| JP | 2006-108970 A | 4/2006 |
| JP | 2006-139297 A | 6/2006 |

* cited by examiner

*Primary Examiner* — Clayton E Laballe
*Assistant Examiner* — Bret Adams
(74) *Attorney, Agent, or Firm* — Sughrue Mion, PLLC

(57) ABSTRACT

An illumination device for a camera includes a light source, in which LED chips are supplied with a drive current, for emitting light of a first color at intensity according to the drive current. An encapsulant is disposed in front of each LED chip, for changing an illuminating color of the light. An EEPROM stores a data table for representing a correlation between the illuminating color and the drive current. An illumination control unit obtains first drive current associated with a target color of light for use by referring to the data table, to drive the LED chips with the first drive current. Phosphor in the encapsulant sets color temperature of the light lower upon passage through the encapsulant than upon emission from the LED chips.

16 Claims, 12 Drawing Sheets

ILLUMINATION DEVICE AND METHOD, AND APPARATUS FOR IMAGE TAKING

BACKGROUND OF THE INVENTION

1. Field of the Invention

The present invention relates to an illumination device and method, and an apparatus for image taking. More particularly, the present invention relates to an illumination device and method, and an apparatus for image taking, in which a color of illuminating light can be changed easily in a simple structure.

2. Description Related to the Prior Art

Cameras of various types are known, including a photographic camera with silver halide, a digital still camera and the like. A flash device is incorporated in some of the cameras for night photography, rear light photography and other purposes. The flash device of the known type has a main capacitor and a discharge tube or xenon tube which is discharged with power from the main capacitor. However, the discharge type has problems in that waiting time is required for charging to cause difficulty in consecutive image taking, and that a very low shutter speed is unsuitable according to short emission of light as long as several milliseconds. Also, a size of the main capacitor is somewhat large and is inconsistent to reduction of the size of the camera body. Spectral distribution of the emitted light of the flash device is near to that of daylight, so that an image of an unsuitable color is created.

There are recently suggested flash devices in which light emitting diodes (LEDs) with high brightness are used. Such flash devices are disclosed in, for example, U.S. Pat. No. 7,106,378 (corresponding to JP-A 2002-116481), JP-A 2006-139297, JP-A 2005-121872 and JP-A 2006-108970. It is possible not to use a main capacitor owing to the use of the LEDs. Also, consecutive image taking is possible. A body of the camera can be compact with a reduced size. Furthermore, light can be emitted continuously, to enable operation of a shutter with a very slow shutter speed.

U.S. Pat. No. 7,106,378 (corresponding to JP-A 2002-116481) and JP-A 2006-139297 disclose a flash device in which LEDs of three colors are used to change the illuminating color. An image can be picked up with a suitable color as light can be emitted with the color adjusted for the relevant condition.

However, a problem remains in LEDs which are uneven characteristically in relation to the quality. Control of the LEDs of the three color according to U.S. Pat. No. 7,106,378 (corresponding to JP-A 2002-116481) and JP-A 2006-139297 is difficult. There is a problem in the cost for the purpose of keeping high precision in the manufacture.

JP-A 2005-121872 discloses suppression of influence of unevenness between LEDs in relation to the quality, but does not suggest a construction in which the illuminating color is changeable. JP-A 2006-108970 discloses a construction in which a light amount is changeable, but does not disclose changeable illuminating color.

SUMMARY OF THE INVENTION

In view of the foregoing problems, an object of the present invention is to provide an illumination device and method, and an apparatus for image taking, in which a color of illuminating light can be changed easily in a simple structure.

In order to achieve the above and other objects and advantages of this invention, an illumination device includes at least one light emitting diode for emitting illuminating light with an illuminating color changeable according to a drive current applied thereto. A memory stores a data table of a correlation between the drive current and the illuminating color. An illumination control unit controls the drive current according to the illuminating color by referring to the data table.

The light emitting diode includes a light emitting diode chip for emitting light of a first color at intensity according to the drive current. A cover covers the light emitting diode chip, the cover having a phosphor component for emitting light of a second color by excitation with the light of the first color, wherein the illuminating color is defined according to a relative amount of the light of the first and second colors.

The drive current is a pulse current, and the illumination control unit controls a duty cycle of the pulse current with an unchanged level of the pulse current, to change the light amount of the light emitting diode.

Furthermore, a temperature sensor measures temperature of the light emitting diode. The data table is associated with each one of temperature levels of the light emitting diode, and the illumination control unit selectively designates the data table according to the temperature measured by the temperature sensor.

Furthermore, a temperature control unit controls temperature of the light emitting diode to keep the illuminating color unchanged or to change the illuminating color.

The at least one light emitting diode is plural light emitting diodes.

The illumination control unit controls a number of the light emitting diodes to be driven according to the drive current determined for the illuminating color and a light amount of light to be used.

The data table is associated with each one of the light emitting diodes, and the illumination control unit controls the drive current of the light emitting diodes according to the data table corresponding thereto.

Furthermore, a temperature sensor measures temperature of the light emitting diode. The data table is associated with each one of temperature levels of the light emitting diode, and the illumination control unit selectively designates the data table according to the temperature measured by the temperature sensor.

Furthermore, a temperature sensor measures temperature of the at least one light emitting diode. A temperature control unit controls temperature of the light emitting diode according to the measured temperature, to keep the illuminating color unchanged or to change the illuminating color.

Furthermore, a plurality of temperature sensors for measure temperature of respectively the light emitting diodes. The data table is associated with each one of temperature levels of the light emitting diodes, and the illumination control unit selectively designates the data table according to the temperature measured by the temperature sensors, to control the drive current discretely for the light emitting diodes.

Furthermore, a plurality of temperature sensors measure temperature of respectively the light emitting diodes. A controller interrupts emission of a first one of the light emitting diodes when temperature of the first light emitting diode becomes higher than a predetermined level, and drives a second one of the light emitting diodes to illuminate.

In one aspect of the invention, an apparatus for image taking of an object is provided, and includes at least one light emitting diode for emitting illuminating light toward the object with an illuminating color changeable according to a drive current applied thereto. A memory stores a data table of a correlation between the drive current and the illuminating color. A color temperature sensor measures color temperature of ambient light present around the object. An illumination control unit controls the drive current by referring to the data table according to color temperature of illuminating light determined by considering the color temperature of the ambient light.

The light emitting diode includes a light emitting diode chip for emitting light of a first color at intensity according to the drive current. A cover covers the light emitting diode chip, the cover having a phosphor component for emitting light of a second color by excitation with the light of the first color, wherein the illuminating color is defined according to a relative amount of the light of the first and second colors.

Furthermore, a controller causes pre-emission of the light emitting diode and causing the light emitting diode to illuminate for image taking. An exposure amount determiner determines an optimized exposure amount during the pre-emission. A determiner determines an exposure condition according to the optimized exposure amount.

The exposure condition is constituted by at least one of ISO sensitivity, shutter speed, and aperture stop value.

In another aspect of the invention, an illumination method of illuminating an object with illuminating light is provided. The illuminating light is emitted by at least one light emitting diode for illumination with an illuminating color changeable according to a drive current applied thereto. The illumination method includes determining the illuminating color of the illuminating light. The drive current is controlled according to the illuminating color by referring to a data table of a correlation between the drive current and the illuminating color.

Also, an illumination device includes a light source, including a light emitting element, supplied with a drive current, for emitting light of a first color at intensity according to the drive current, and an encapsulant, disposed in front of the light emitting element, for changing an illuminating color of the light. A memory stores a data table for representing a correlation between the illuminating color and the drive current. An illumination control unit obtains first drive current associated with a target color of light for use by referring to the data table, wherein the light emitting element emits the light at intensity according to the first drive current, for the illuminating color to be the target color.

In addition, a computer executable program for illuminating with a light source is provided, the light source including a light emitting element, supplied with a drive current, for emitting light of a first color at intensity according to the drive current. An illuminating color of the light is changed according to a change in the intensity by use of an encapsulant disposed in front of the light emitting element. The computer executable program includes a program code for predetermining a correlation between the illuminating color and the drive current. A program code is for obtaining first drive current associated with a target color of light for use by referring to the correlation, wherein the light emitting element emits the light at intensity according to the first drive current, for the illuminating color to be the target color.

Consequently, the illuminating color of the light from the illumination device can be changed easily in a simple structure, because the drive current for the light source can be adjusted in combination with the first and second colors in the light source.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
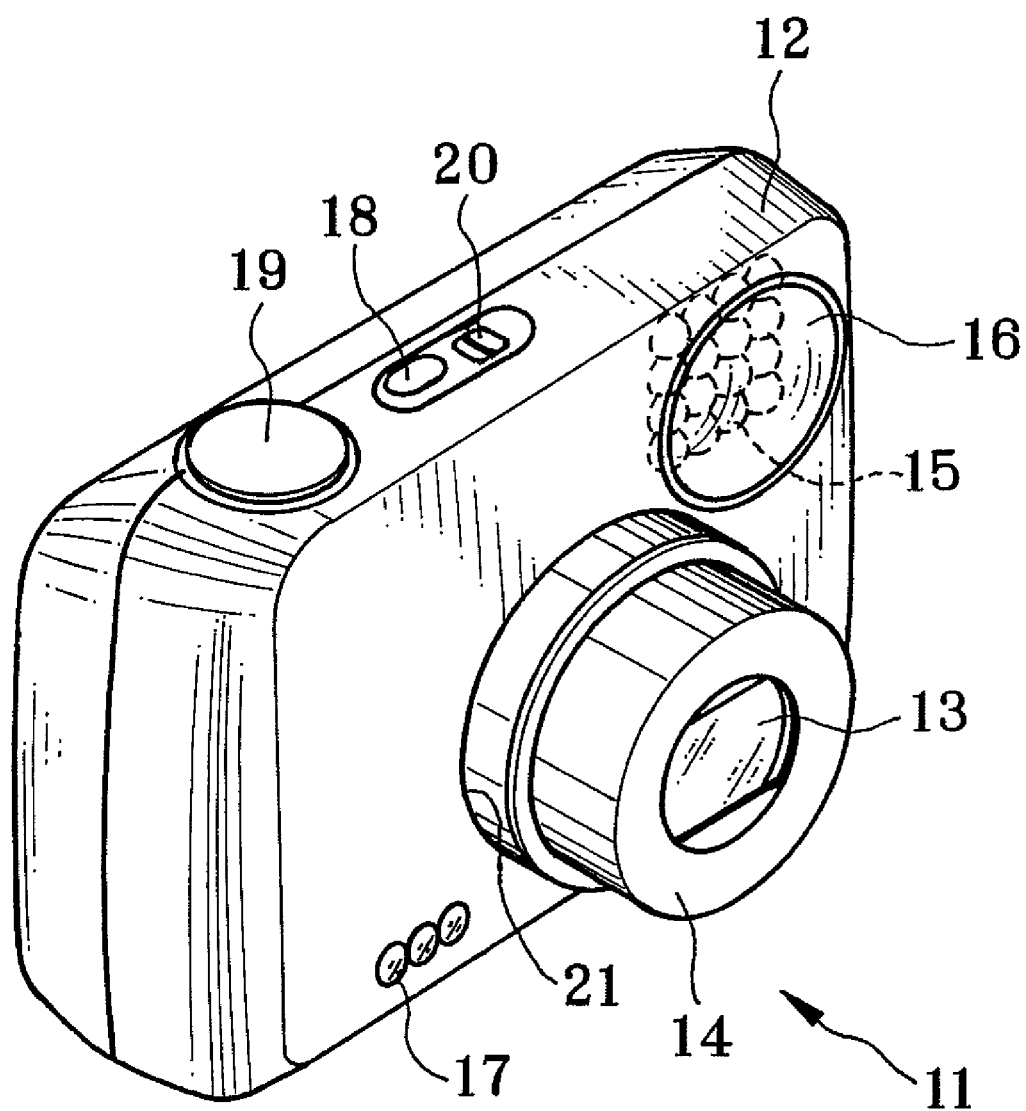
FIG. 1 is a perspective view illustrating a digital still camera.

In FIG. 1, a digital still camera 11 as apparatus for image taking of the invention is illustrated. The digital still camera 11 includes a camera body 12. A front of the camera body 12 has a lens barrel 14, a light source window 16 and a color temperature sensor 17. A lens system 13 is incorporated in the lens barrel 14. An LED light source 15 or LED matrix in an illumination device or assembly is positioned behind the light source window 16, and emits illuminating light in synchronism with image pickup. The color temperature sensor 17 detects color temperature of light around the camera body 12.

An upper face of the camera body 12 includes a power switch 18, a shutter release button 19 and a mode selector 20. The power switch 18 turns on or off the digital still camera 11 when operated. The shutter release button 19 is a pushbutton depressible at two depths. When the shutter release button 19 is depressed halfway, tasks prior to image pickup are performed, including the AF control, AE control and the like. When the shutter release button 19 is depressed fully after the half depression, an instruction signal is output to the digital still camera 11 for image pickup. An image signal of one image frame after the prior tasks is converted into image data. The mode selector 20 is operable to change over modes, which include a still image pickup mode for recording a still image, and a playback mode for playback of a recorded image.

The lens barrel 14 is a collapsible type. A lens chamber 21 is formed in a front side of the camera body 12, and contains the lens barrel 14 when the power source of the digital still camera 11 is turned off. The lens barrel 14 comes to protrude from the front side of the camera body 12 when the power source is turned on, and becomes positioned at the wide-angle end.

Figure 2:
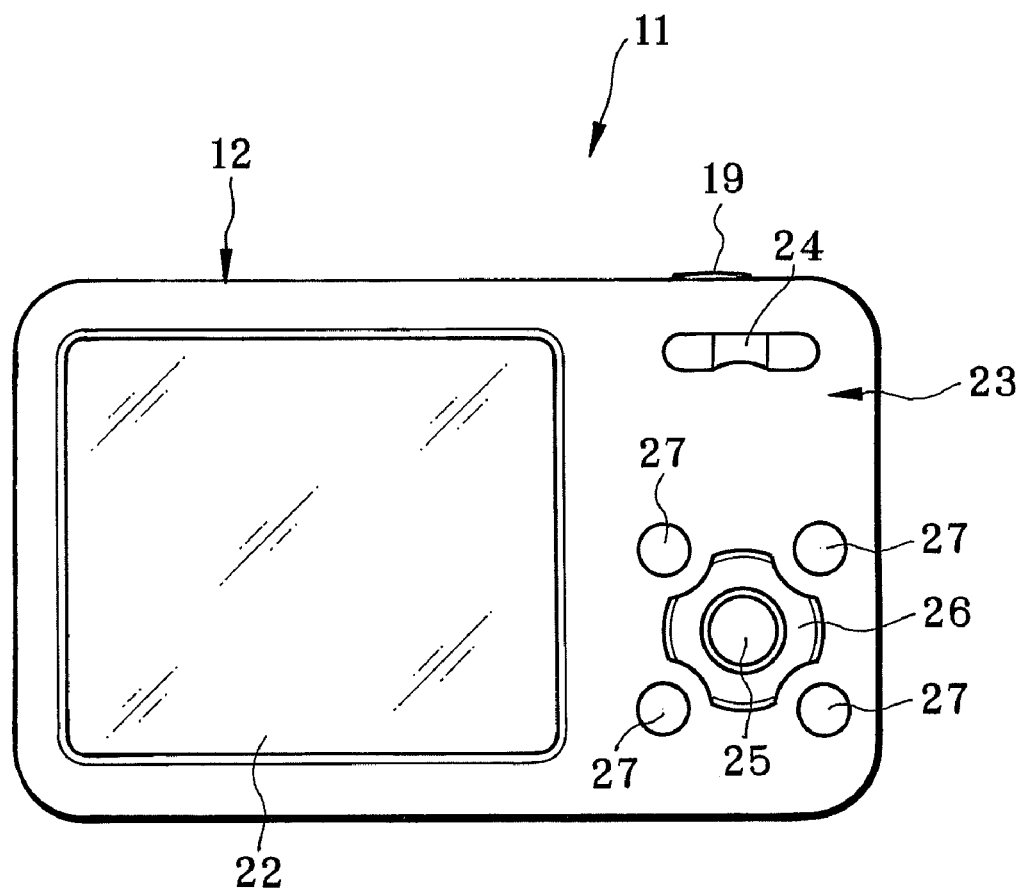
FIG. 2 is an rear elevation illustrating the digital still camera.

In FIG. 2, a rear of the camera body 12 has an LCD display panel 22 and an input interface 23. The display panel 22 includes various images and patterns, including a recorded image, a live image, and menu screens of plural types. The input interface 23 includes a zoom button 24, a menu button 25, a cross shaped key 26 and sub buttons 27.

The zoom button 24 is operated to move the lens system 13 in a direction toward the wide angle side or telephoto side. The menu button 25 is depressed for displaying a menu screen on the display panel 22 or entry of a selected item. The cross shaped key 26 is operated for moving a cursor in the menu screen. The sub buttons 27 are depressed for various purposes of selection and setting.

Figure 3A:
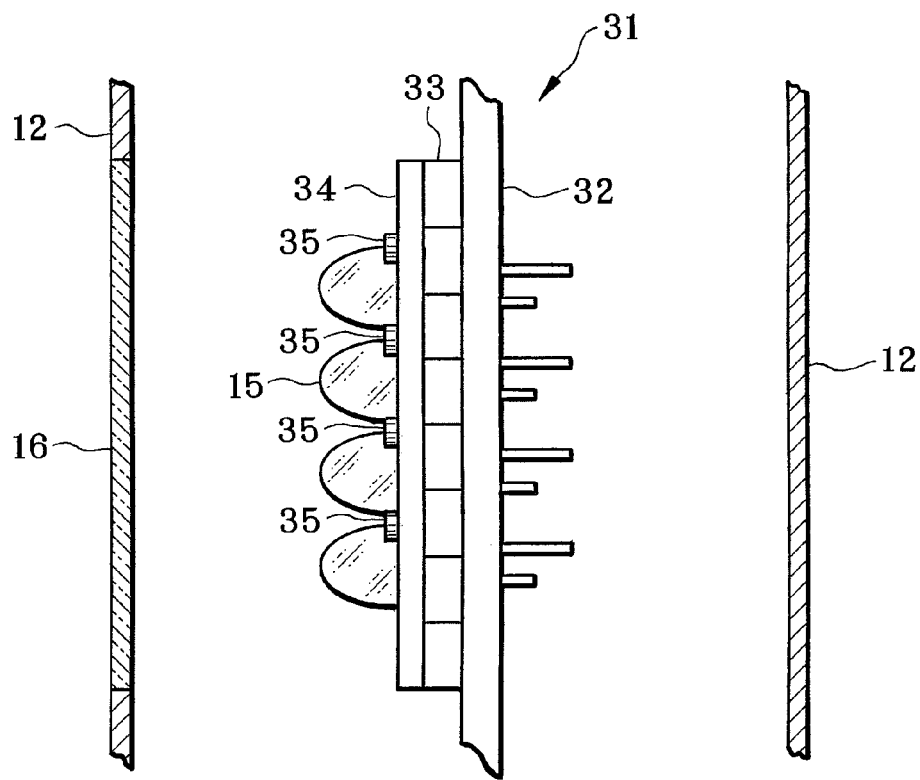
FIG. 3A is an explanatory view illustrating an illumination device in the digital still camera.
Figure 3B:
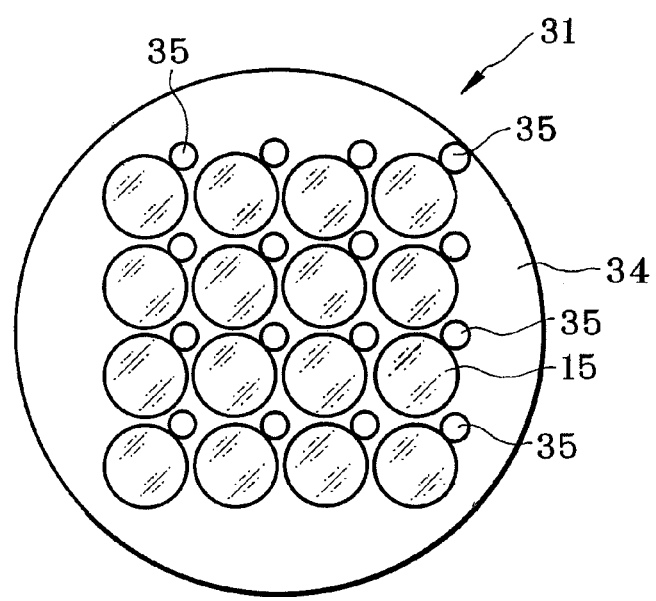
FIG. 3B is a front view illustrating a light source in the illumination device.

An illumination device 31 or assembly or illuminator is incorporated in the camera body 12, disposed behind the light source window 16, and emits light to illuminate an object. In FIGS. 3A and 3B, the illumination device 31 or assembly is constituted by the light source 15, a support panel 32, a Peltier element or Peltier device 33, a heat dissipator 34, and a temperature sensor 35.

The support panel 32 is a support for the light source 15 on the inside of the camera body 12. The Peltier device 33 is mounted on a front surface of the support panel 32. The heat dissipator 34 in a disk shape is disposed on the Peltier device 33. The light source 15 includes 16 light emitting diodes (LEDs) 15a-15p as light emitting elements as light source units, which are arranged regularly in a 4×4 matrix form on the heat dissipator 34. An illumination control unit 81 of FIG. 7 controls light emission of the LEDs 15a-15p. Examples of conditions of the light emission are the number of LEDs of the LEDs 15a-15p to be driven, color temperature of the illuminating light, intensity of the light, a light amount of the light per unit time, and the like. Note that the number of the LEDs 15a-15p can be suitably determined in a manner different from 16.

Figure 4:
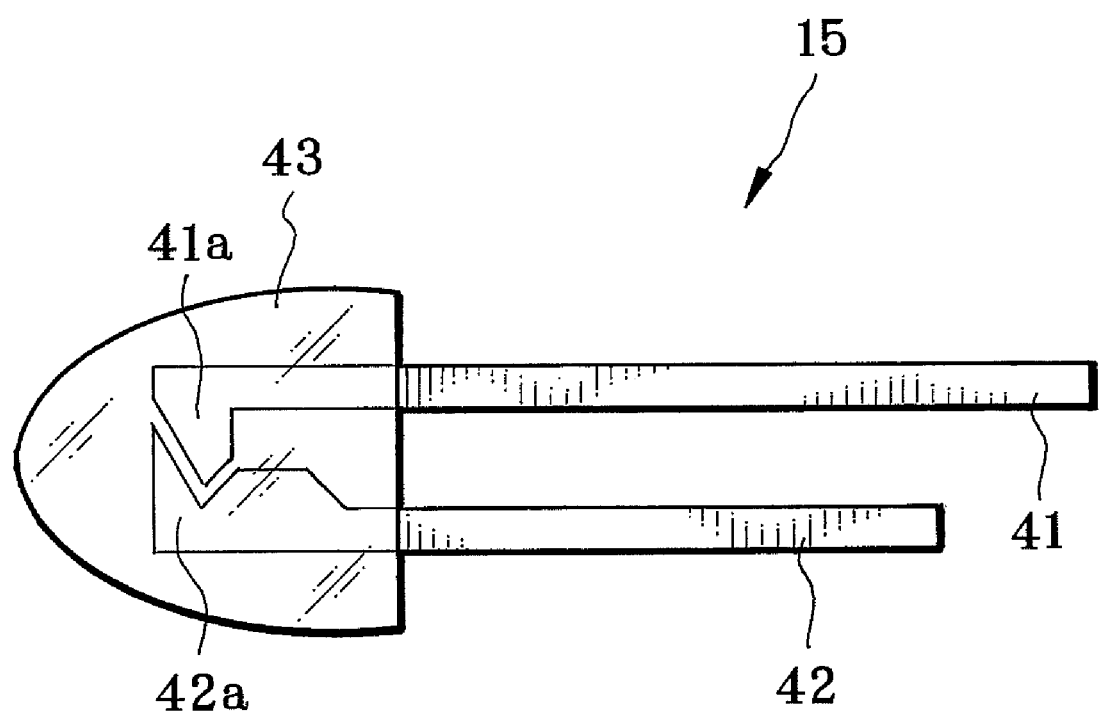
FIG. 4 is an elevation illustrating one of light source units including a light emitting diode (LED)

In FIG. 4, each of the LEDs 15a-15p includes a first chip area 41 with an electrode on a positive side, a second chip area 42 with an electrode on a negative side, and a cover layer 43. The cover layer 43 covers semiconductor layers 41a and 42a of the first and second chip areas 41 and 42 at a p-n junction. The semiconductor layer 41a is a p-type, the semiconductor layer 42a an n-type. The cover layer 43 contains phosphor of a yellow color as second color, for example, YAG yellow phosphor. A form of the phosphor in the cover layer 43 is not limited. For example, the cover layer 43 can have a transparent cover portion and the phosphor overlaid on the surface of the cover portion.

For example, the cover layer may be constructed by initially mixing a phosphor component in transparent resin, and then molding the resin to enclose the chip areas of the LEDs as lower layer. Also, a cover layer may be constructed by initially positioning a phosphor component in contact with the front of the chip areas, and then molding transparent resin to enclose the phosphor component and the chip areas together therewith as lower layer.

In each of the LEDs 15a-15p, a current flow in the p-n junction between the semiconductor layers 41a and 42a when a potential difference occurs between the first and second chip areas 41 and 42, so that light of a blue color as first color is emitted. When the current increases, intensity of the light increases. Upon passage of the blue light through the cover layer 43, light is emitted with an illuminating color distinct from the blue color. The illuminating color is changeable according to the proportion of the blue light with respect to the yellow color of the cover layer 43 with yellow phosphor.

Heat, which the light source 15 generates in the light emission, is transmitted to the Peltier device 33 by the heat dissipator 34. The Peltier device 33 as a temperature control unit is a known device in which heat of its first surface is conducted to the second surface when a direct current flows through, to cool the first surface. Heat from the heat dissipator 34 is removed toward a position of the support panel 32 to prevent overheat of the light source 15.

The temperature sensor 35 is associated with each of the LEDs 15a-15p, which are controlled in consideration of the temperature measured by the temperature sensor 35. When the temperature of the LEDs 15a-15p reaches the highest tolerable level, the LEDs 15a-15p in use are changed over. An example of the temperature sensor 35 is a thermistor known in the art. The LEDs 15a-15p are arranged in four arrays, which are the LEDs 15a-15d, 15e-15h, 15i-15l, and 15m-15p.

Figure 5A:
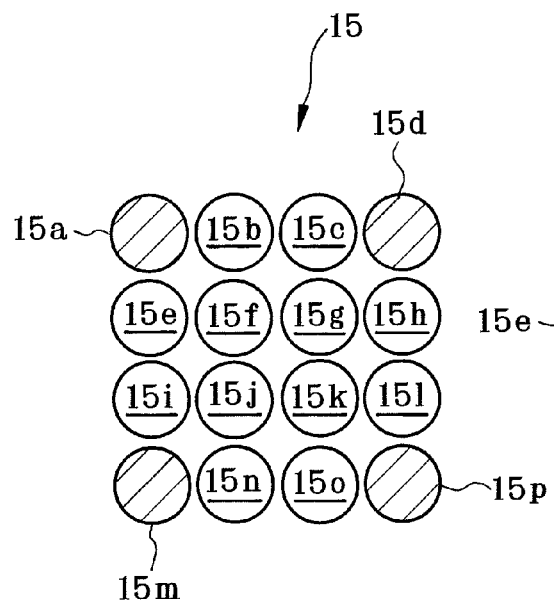
FIG. 5A is an explanatory view illustrating illuminating statuses of the LEDs in the light source.
Figure 5B:
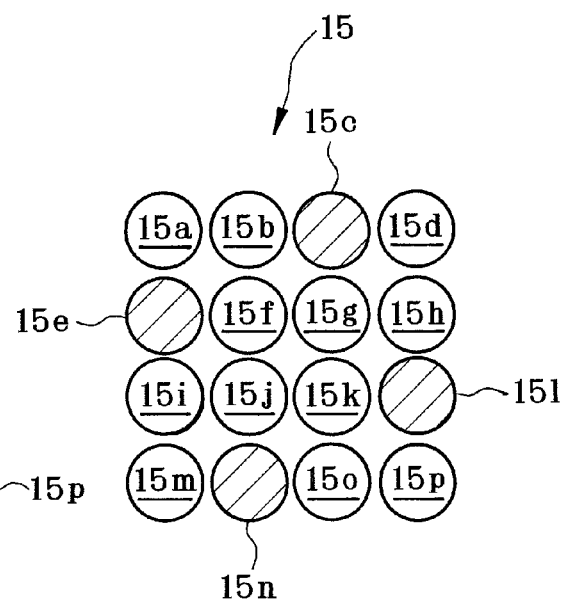
FIGS. 5B, 5C and 5D are explanatory views in front elevation, illustrating other illuminating statuses of the LEDs.
Figure 6A:
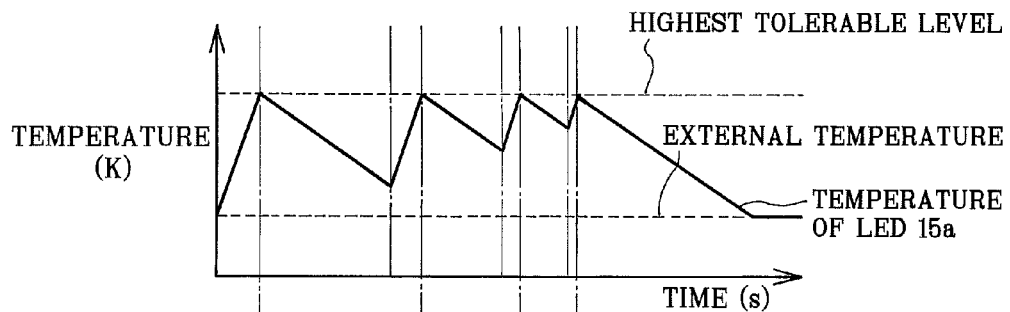
FIG. 6A is a graph illustrating temperature changing with time.
Figure 6B:
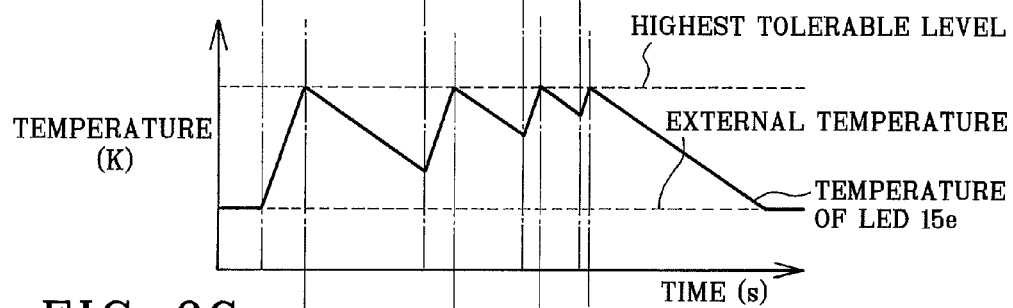
FIGS. 6B, 6C and 6D are graphs illustrating other examples of the temperature.

Let four of the LEDs 15a-15p illuminate. In FIG. 5A, the LEDs 15a, 15d, 15m and 15p illuminate at first. The temperature of the LEDs 15a, 15d, 15m and 15p increases as illustrated in FIG. 6A because of heating with light emission. When the temperature rises and reaches to the highest tolerable level, then illumination of the light source 15 is changed over to the LEDs 15c, 15e, 15l and 15n in FIG. 5B. The temperature of the LEDs 15c, 15e, 15l and 15n increases as illustrated in FIG. 6B because of heating with light emission. The temperature of the LEDs 15a, 15d, 15m and 15p starts decreasing as illustrated in FIG. 6A.

Figure 5C:
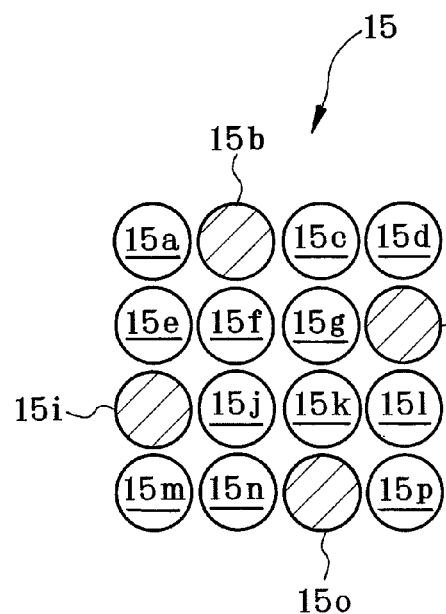
Figure 6C:
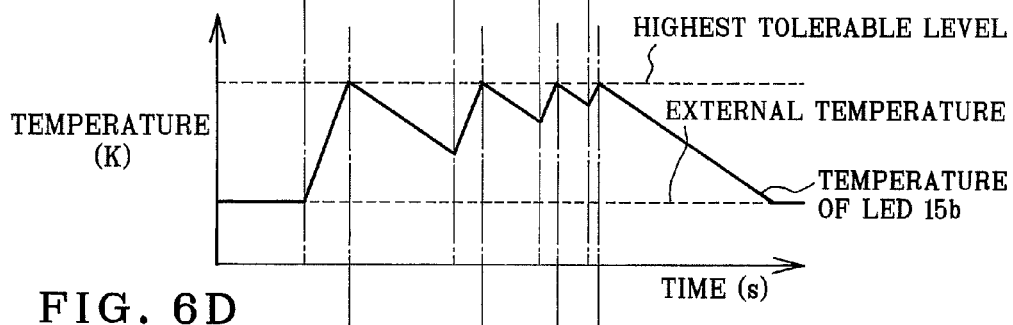

When the temperature of the LEDs 15c, 15e, 15l and 15n rises and reaches to the highest tolerable level, then illumination of the light source 15 is changed over to the LEDs 15b, 15h, 15i and 15o in FIG. 5C. The temperature of the LEDs 15b, 15h, 15i and 15o increases as illustrated in FIG. 6C because of heating with light emission. The temperature of the LEDs 15c, 15e, 15l and 15n starts decreasing as illustrated in FIG. 6B.

Figure 5D:
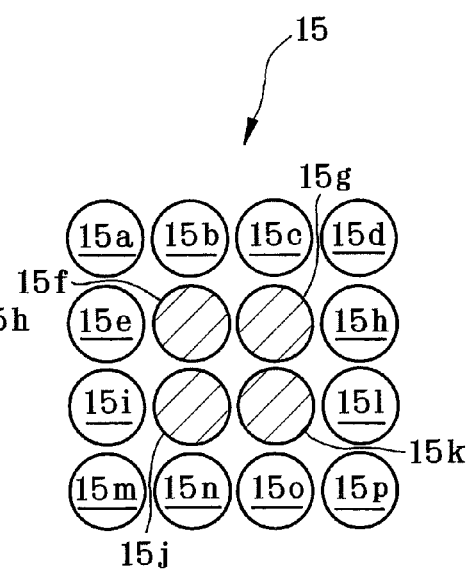
Figure 6D:
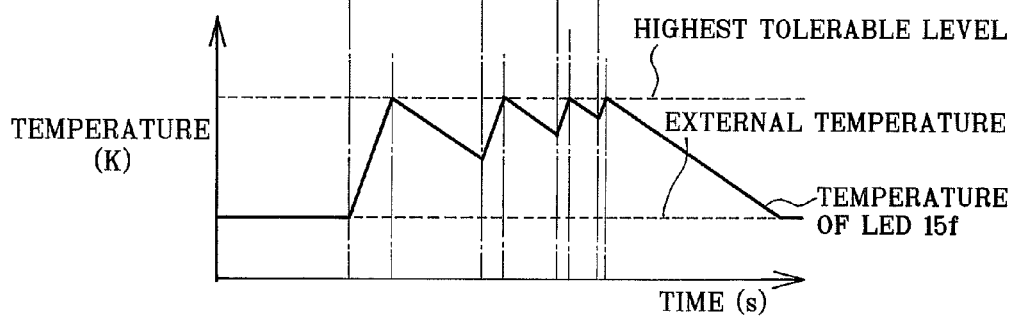

When the temperature of the LEDs 15b, 15h, 15i and 15o rises and reaches to the highest tolerable level, then illumination of the light source 15 is changed over to the LEDs 15f, 15g, 15j and 15k in FIG. 5D. The temperature of the LEDs 15f, 15g, 15j and 15k increases as illustrated in FIG. 6D because of heating with light emission. The temperature of the LEDs 15b, 15h, 15i and 15o starts decreasing as illustrated in FIG. 6C.

When the temperature of the LEDs 15f, 15g, 15j and 15k rises and reaches to the highest tolerable level, then illumination of the light source 15 is changed over to the LEDs 15a, 15d, 15m and 15p in FIG. 5A. The temperature of the LEDs 15a, 15d, 15m and 15p increases as illustrated in FIG. 6A because of heating with light emission. The temperature of the LEDs 15f, 15g, 15j and 15k starts decreasing as illustrated in FIG. 6D. Thus, the LEDs 15a-15p are changed over group after group upon the reach to the highest tolerable level. The temperature of the light source 15 is kept from becoming higher than the highest. Note that each group of LEDs being driven preferably includes LEDs disposed distantly from one another without adjacent disposition, for the purpose of avoiding influence of the temperature between the LEDs 15a-15p. See FIGS. 5A-5C.

Figure 7:
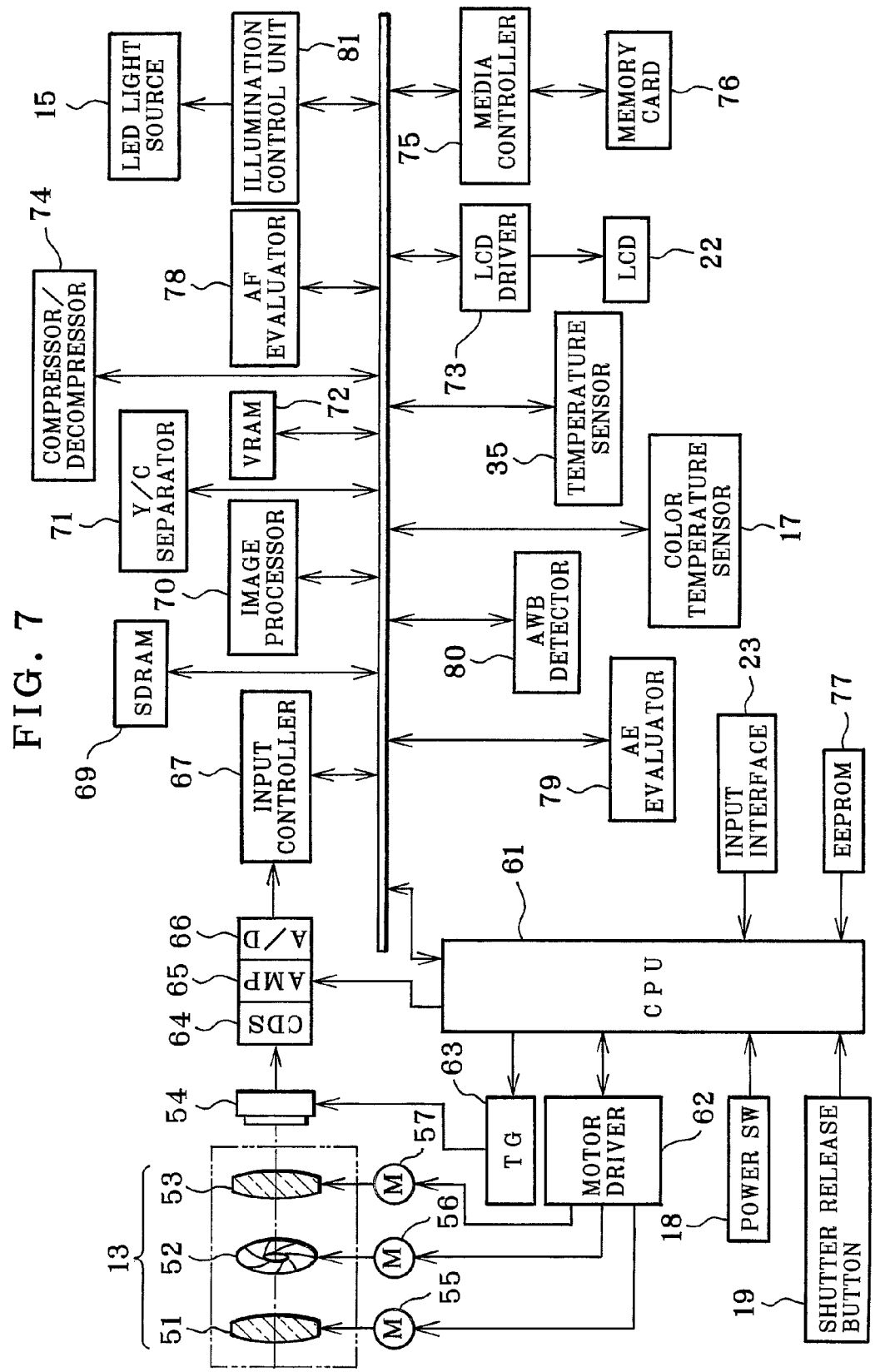
FIG. 7 is a block diagram schematically illustrating circuit elements in the digital still camera.

In FIG. 7, various elements in the camera body 12 include a variator lens/lens group 51, an aperture stop mechanism 52, a focus lens/lens group 53 and a CCD image sensor 54. A zoom motor 55 drives the variator lens/lens group 51. An iris motor 56 changes the aperture diameter of the aperture stop mechanism 52. A focus lens motor 57 drives the focus lens/ lens group 53 for adjusting the focus. A motor driver 62 is connected with the motors 55-57. A CPU 61 causes the motor driver 62 to control the motors 55-57. Note that the lens system 13 of FIG. 1 is constituted by the variator lens/lens group 51, the aperture stop mechanism 52 and the focus lens/lens group 53.

The CCD image sensor 54 photographs an image focused by the lens system 13. A timing generator (TG) 63 is connected with the CCD image sensor 54, is controlled by the CPU 61. A shutter speed of the electronic shutter is determined according to the clock pulse or timing signal generated by the timing generator 63.

A CDS (correlated double sampling circuit) 64 is supplied with an image signal output by the CCD image sensor 54. The CDS 64 generates image data of R, G and B directly corresponding to an amount of stored charge of respective cells of the CCD image sensor 54. An amplifier 65 amplifies the image data. An A/D converter 66 converts the amplified image data to a digital signal.

An input controller 67 is connected by a data bus 68 to the CPU 61, and controls the CCD image sensor 54, the CDS 64, the amplifier 65 and the A/D converter 66 according to instruction signals from the CPU 61. Image data is output by the A/D converter 66 at a regular interval. An SDRAM 69 is caused to store the output image data in a temporary manner. The SDRAM 69 is used as a working memory.

An image processor 70 reads image data from the SDRAM 69, processes the image data by image processing of various steps including gradation conversion, white balance correction (WB), gamma correction and the like. The processed image data is written to the SDRAM 69. A Y/C separator 71 reads processed image data from the SDRAM 69 after processing in the image processor 70, and converts the same into a luminance signal Y and a chrominance signal Cr and Cb.

A VRAM 72 is storage for the purpose of outputting a live image to the display panel 22, and stores processed image data after processing in the image processor 70 and the Y/C separator 71. The VRAM 72 includes memory regions of two frames for the purpose of simultaneous writing and reading of image data. An LCD driver 73 converts the image data from the VRAM 72 into a composite signal of an analog form, so as to display a live image on the display panel 22.

A compressor/decompressor 74 compresses the form of the image data after the Y/C separation in the Y/C separator 71 according to a predetermined format, for example JPEG (Joint Photographic Expert Group) format. A media controller 75 receives the compressed image data. A memory card 76 is accessed by the media controller 75 and caused to store the image data. In the playback mode, image data is read from the memory card 76 by the compressor/decompressor 74, which decompresses the image data to display an image on the display panel 22.

Also, an EEPROM 77 as memory is connected with the CPU 61, and stores control programs and preset information. The CPU 61 reads information from the EEPROM 77, writes the same to the SDRAM 69, and performs tasks.

An AF evaluator 78, an AE evaluator 79 and an AWB detector 80 are connected with the data bus 68. The AF evaluator 78 as exposure amount determiner evaluates propriety of a focused position of the variator lens/lens group 51. The AE evaluator 79 evaluates the exposure condition, for example, a shutter speed of an electronic shutter of the CCD image sensor 54, sensitivity of the CCD image sensor 54, and the aperture stop value of the aperture stop mechanism 52 and the like. The AWB detector 80 detects propriety of correction of white balance.

The AF evaluator 78, the AE evaluator 79 and the AWB detector 80 transmit detection results to the CPU 61 through the data bus 68. In response to the detection results, the CPU 61 controls operation of the variator lens/lens group 51, the aperture stop mechanism 52, the focus lens/lens group 53, the CCD image sensor 54 and the like discretely.

The AF evaluator 78 controls focusing according to the contrast detection method. At first, a component of an image is derived according to one or plural focus evaluation regions or AF areas predetermined for focus evaluation, so a contrast value is obtained. An object distance to an object is determined according to the contrast value, to obtain a set position of the focus lens/lens group 53 for focusing. In the still image pickup mode, the focus adjustment is carried out upon halfway depression of the shutter release button 19.

The AE evaluator 79 and the AWB detector 80 determine an optimized exposure amount and a WB correction amount according to luminance information in the image data stored in the VRAM 72. The CPU 61 is supplied with information of the amounts by the AE evaluator 79 and the AWB detector 80. In response, the CPU 61 controls the electronic shutter, the aperture stop mechanism 52 and the image processing.

The color temperature sensor 17, the temperature sensor 35 and the illumination control unit 81 are connected with the data bus 68 as well as the AF evaluator 78, the AE evaluator 79 and the AWB detector 80. The color temperature sensor 17 detects the color temperature of ambient light. The temperature sensor 35 measures temperature of each of the LEDs 15a-15p. The illumination control unit 81 controls illumination of the light source 15. Each of the color temperature sensor 17 and the temperature sensor 35 transmits an output of the detection or measurement to the CPU 61 with the data bus 68. The CPU 61 performs tasks of control according to the output from the color temperature sensor 17 and the temperature sensor 35. An example of the color temperature sensor 17 can be a photo sensor well-known in the art.

The illumination control unit 81 controls the light source 15 to illuminate in synchronism with image pickup. Specifically, a drive current in total for the light source 15 is kept constant. The number of LEDs among the LEDs 15a-15p is adjusted to change the drive current per one LED. Table 1 indicates a relationship between the drive current (mA) and the color temperature (K) of the illuminating color. When the drive current is 1,000 mA, the color temperature is 7500 K. The drive current decreases stepwise to decrease the color temperature. When the drive current is 250 mA, the color temperature is 550 K. Note that a step of changes in the drive current is 100, 150 or 250 mA. However, any value can be set for a step of changes in the drive current, for example 10 mA or still smaller.

A relationship between the drive current (mA) and the color temperature (K) of the light is different between the LEDs 15a-15p. This relationship changes with temperature characteristically with respect to each one of the LEDs 15a-15p. This is because of a shift in the wavelength of the light, a change in the voltage (V) relative to the drive current, and a change in optical transmittance of the cover layer 43 coated with yellow phosphor. The EEPROM 77 stores a plurality of data tables of a relationship between the drive current (mA) and the color temperature (K) of the light, for a plurality of the LEDs 15a-15p and for plural temperature levels of those. The illumination control unit 81 refers to the data table to adjust the light emission by control of electric energy.

TABLE 1

| Drive current (mA) | Color temperature (K) of light of illuminating color |
|---|---|
| 1,000 | 7500 |
| 750 | 7000 |
| 500 | 6500 |
| 350 | 5900 |
| 250 | 5500 |

Thus, the above controls makes it possible to change the illuminating color of the LEDs 15a-15p while the intensity of light of the entirety of the light source 15 is kept unchanged. For example, the total of the drive current for the light source 15 is set as 4,000 mA. The control of the number of the LEDs 15a-15p to be driven will be hereinafter described.

Figure 8A:
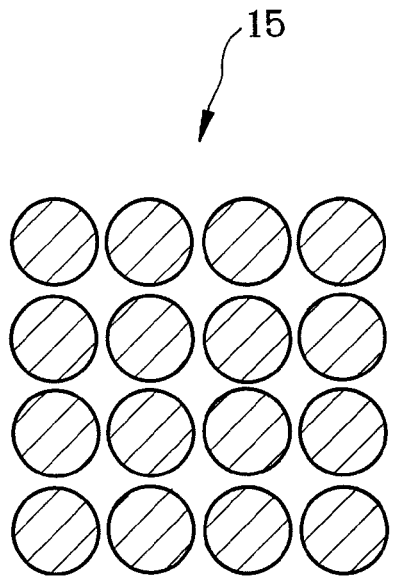
FIG. 8A is an explanatory view in front elevation, illustrating another preferred illuminating operation with an illuminating status of the LEDs in the light source.
Figure 8B:
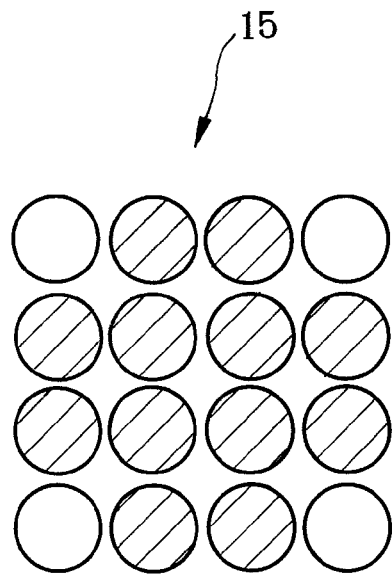
FIGS. 8B, 8C and 8D are explanatory view illustrating illuminating statuses of the LEDs.
Figure 8C:
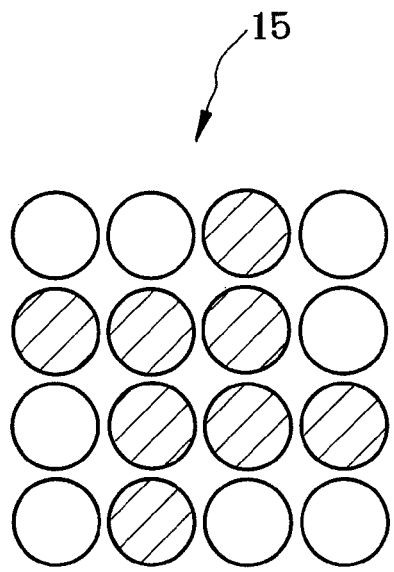
Figure 8D:
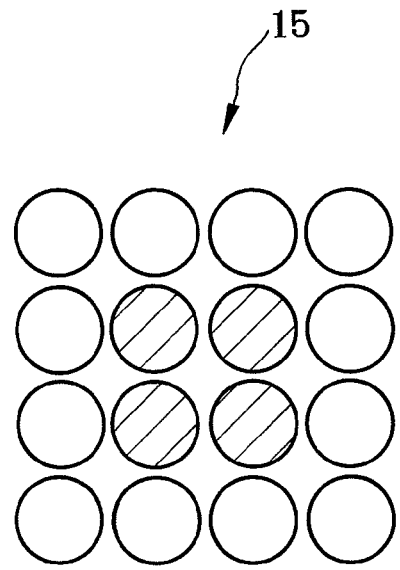

In FIG. 8A, all the sixteen LEDs 15a-15p are driven. A drive current for one of the LEDs 15a-15p is 250 mA as 4,000/16. The color temperature of the light of the light source 15 is 5500 K. In FIG. 8B, 12 of the LEDs 15a-15p are driven. A drive current for one of the LEDs 15a-15p is approximately 350 mA as 4,000/12. The color temperature of the light of the light source 15 is 5900 K. In FIG. 8C, 8 of the LEDs 15a-15p are driven. A drive current for one of the LEDs 15a-15p is 500 mA as 4,000/8. The color temperature of the light of the light source 15 is 6500 K. In FIG. 8D, 4 of the LEDs 15a-15p are driven. A drive current for one of the LEDs 15a-15p is 1,000 mA as 4,000/4. The color temperature of the light of the light source 15 is 7500 K.

Also, the illumination control unit 81 changes over the LEDs 15a-15p in consideration of their temperature. See FIGS. 5A, 5B, 5C and 5D.

The operation of the digital still camera 11 is described by referring to the drawings. At first, the power switch 18 of the digital still camera 11 is manually depressed to turn on the power source. A live image is displayed on the LCD display panel 22, which a user can observe for determining his or her framing of an object.

Figure 9:
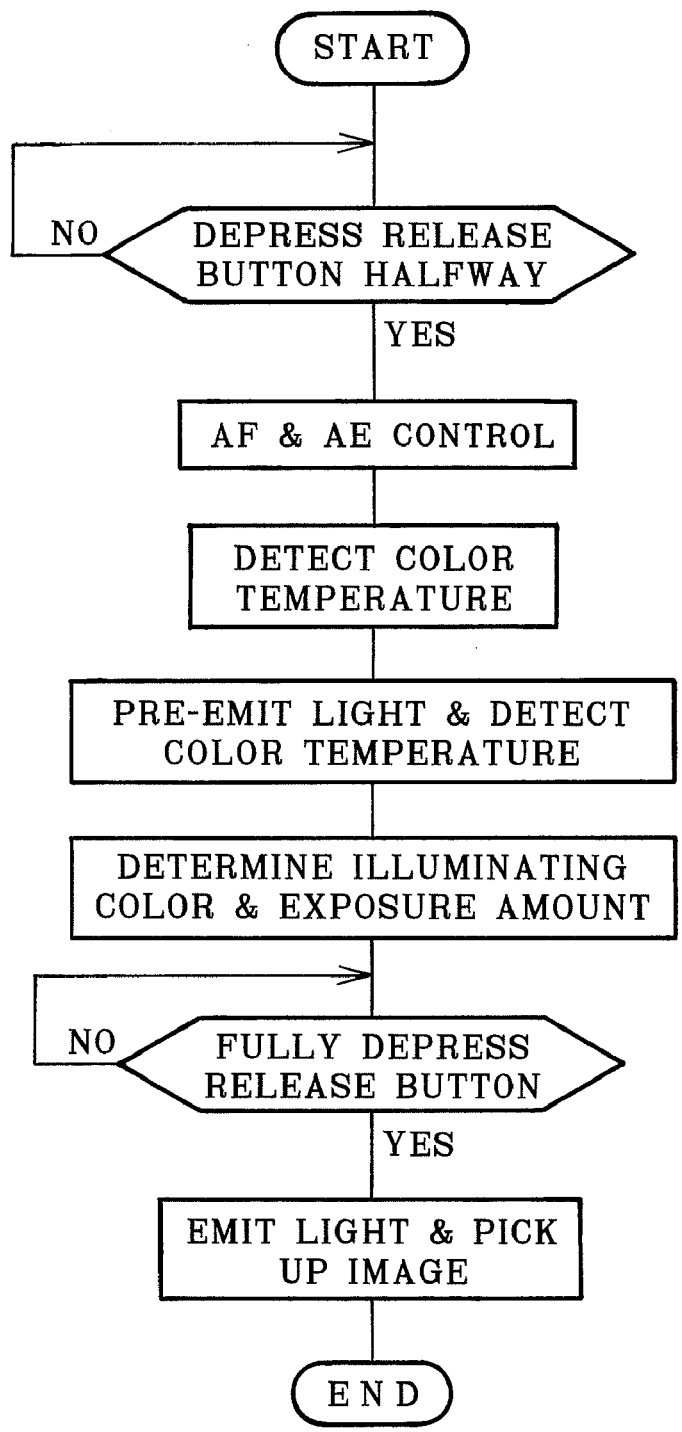
FIG. 9 is a flow chart illustrating the operation of the digital still camera.

In FIG. 9, the shutter release button 19 is depressed halfway, to perform tasks of the AF control, AE control and the like to stand by for image pickup. For example, a task of an exposure determination is performed to determine an illuminating color of the LED light source 15 or LED matrix of the illumination device 31 or assembly in the image pickup. At first, color temperature of ambient light around the camera body 12, or that of light from the scene, is detected by the color temperature sensor 17. The light source 15 is driven for pre-emission in a suitable condition while the color temperature sensor 17 detects color temperature of ambient light for a second time. Values of the color temperature before and during the pre-emission are compared with one another, to determine the illuminating color and the exposure amount in a main image pickup.

Then the shutter release button 19 is fully depressed, to cause the light source 15 to illuminate and pick up an image in the condition determined in the standby operation. The exposure amount is adjusted according to the light amount of the light source 15 and also the ISO sensitivity, shutter speed, aperture stop value and the like.

In the above embodiment, the number of the light emitting diodes (LEDs) 15a-15p to be driven is changed while the drive current in total for the light source 15 is kept unchanged. However, other methods may be used. It is possible to adjust a duty cycle of a drive current in a form of a pulse current. Specifically, the drive current in total for the light source 15 is kept unchanged to maintain a level of intensity of light. The duty cycle of the drive current is changed to change a light amount of the light source 15 per unit time. Therefore, it is possible to change the light amount of the light source 15 per unit time while the illuminating color of the light source 15 is unchanged.

Figure 10A:
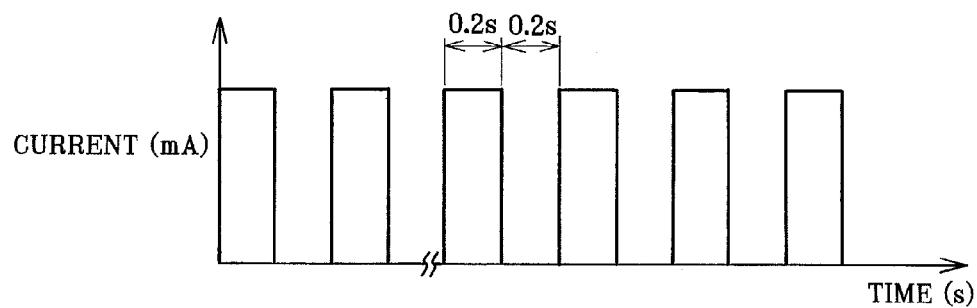
FIG. 10A is a graph illustrating an example of a drive current supplied to the LEDs.
Figure 10B:
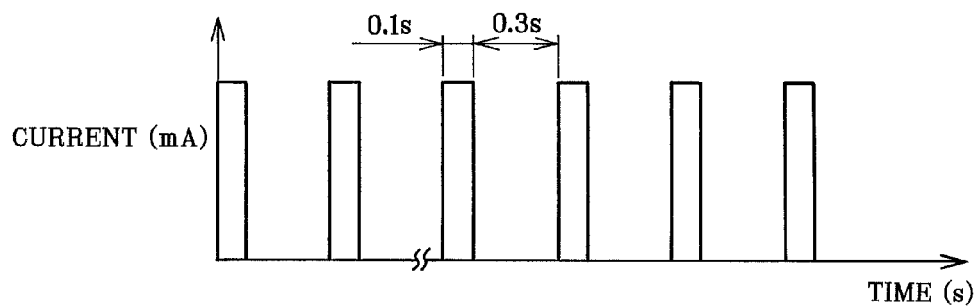
FIGS. 10B and 10C are graphs illustrating other examples of the drive current.
Figure 10C:
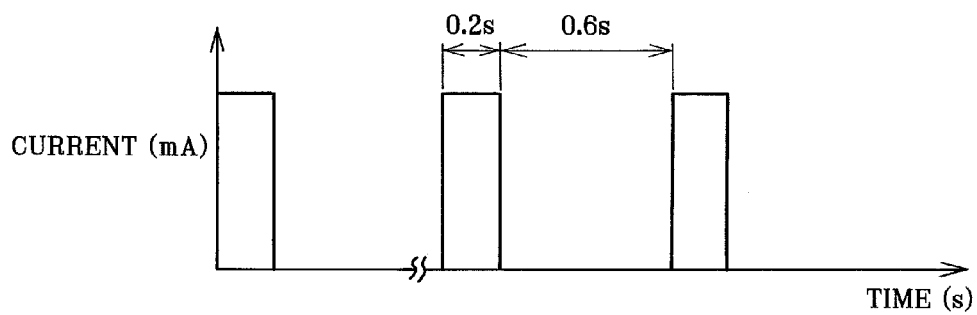

In FIG. 10A, an example is illustrated. A pulse period of light emission is 0.4 second. Time of powering is 0.2 second which is a half of the pulse period. Thus, a light amount is made 50% as much as a reference light amount according to a continuously flowing drive current. In FIG. 10B, the pulse period of light emission is 0.4 second in a fixed manner. Time of powering is 0.1 second which is a quarter of the pulse period. Thus, a light amount is made 25% as much as the reference light amount. Alternatively, it is possible to change the pulse period with an unchanged state of time of powering. In FIG. 10C, time of powering is 0.2 second in a manner equal to that of FIG. 10A. A pulse period of light emission is 0.8 second which is two times as that according to FIGS. 10A and 10B. Thus, a light amount is made 25% as much as the reference light amount. Note that in any graph of FIGS. 10A-10C, the area is proportional to the light amount.

Figure 11A:
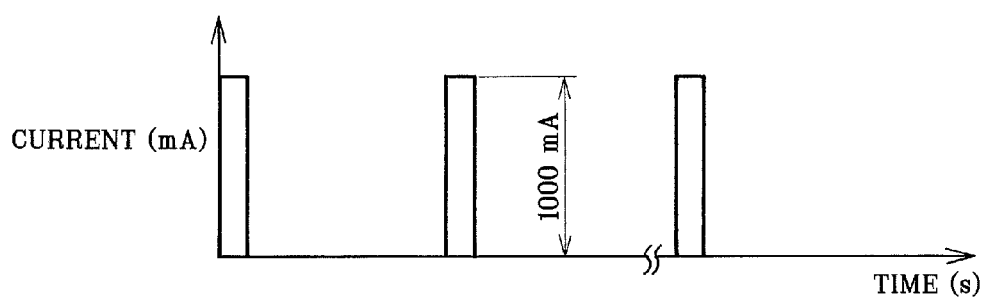
FIGS. 11A, 11B and 11C are graphs illustrating various examples of the drive current.
Figure 11B:
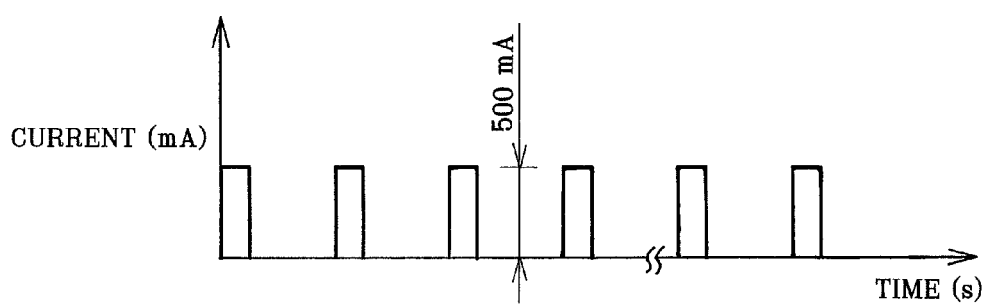
Figure 11C:
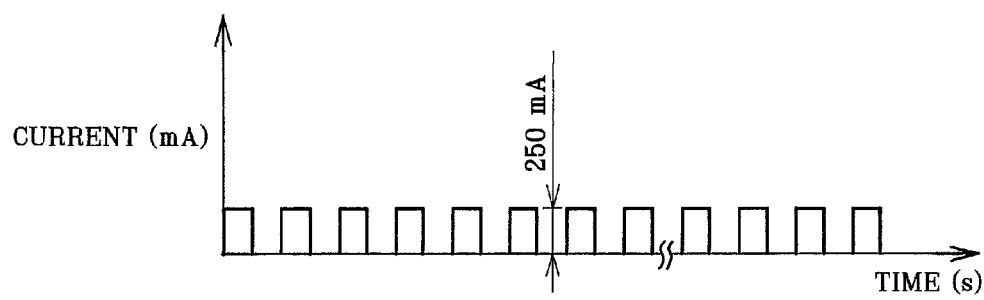

Furthermore, the illumination control unit 81 can control a duty cycle of the drive current flowing across the light source 15 according to the value of the drive current. It is possible to change the illuminating color of the light source 15 while the light amount of the light source 15 is constant. For example, the drive current is reduced to a value half as high as before, and also a duty cycle of the drive current is enlarged to a value twice as high as before. In FIG. 11A, an initial drive current is 1,000 mA. A duty cycle of the drive current as pulse current is 12.5%. In FIG. 11B, the drive current is set at 500 mA which is half as high as that of the first status. The duty cycle is set at 25% which is twice as much as before. The illuminating color can be changed while the light amount is constant. In FIG. 11C, the drive current is set at 250 mA which is still lower. The duty cycle is set at 50% which is more than before. The illuminating color can be changed while the light amount is constant. Note that in FIGS. 11A-11C, the area is proportional to the light amount of the emitted light.

In an alternative example of emission control, the drive current for the light source 15 can be constant. The temperature of the LEDs 15a-15p can be adjusted to change the illuminating color of light of the light source 15. To this end, an additional device can be preferably used in combination with the Peltier device 33 to adjust the temperature of the LEDs 15a-15p, for example, a heating element.

In the above embodiment, the LEDs 15a-15p illuminate simultaneously in FIGS. 5A-5D. However, it is possible to drive selected ones of the LEDs 15a-15p in the LED light source 15 or LED matrix in combinations according to unevenness in the product quality between those. It is possible to reduce unevenness in the light amount between such combinations of the LEDs.

For example, unevenness of the voltage applied to the light source 15 in response to the flow of the predetermined drive current is considered, to drive selected ones of the LEDs 15a-15p for LED combinations of which sums of the voltage values for LEDs will be nearly equal to one another. Table 2 indicates the voltage detected upon the flow of the drive current of 500 mA for each of the LEDs 15a-15p. For example, the voltage for each of the LEDs 15a, 15b, 15c and 15e is 3.5 volts. The voltage for each of the LEDs 15d, 15f, 15g and 15i is 3.6 volts.

TABLE 2

| LEDs | Voltage (V) in the condition of drive current of 500 mA |
|---|---|
| 15a, 15b, 15c and 15e | 3.5 |
| 15d, 15f, 15g, and 15i | 3.6 |
| 15h, 15j, 15k and 15l | 3.7 |
| 15m, 15n, 15o and 15p | 3.8 |

Figure 12A:
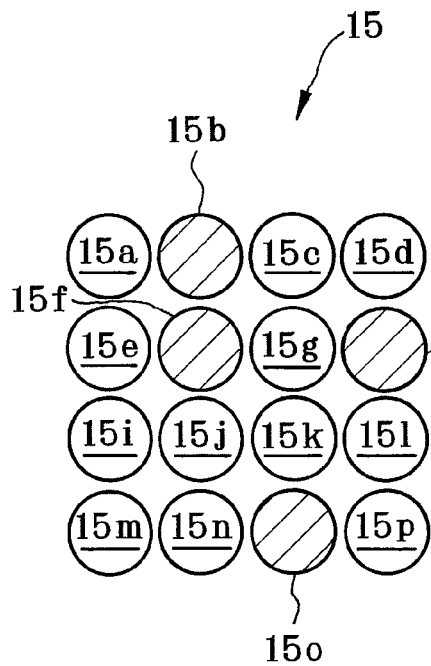
FIGS. 12A, 12B, 12C and 12D are explanatory views in front elevation, illustrating still another preferred illuminating operation with illuminating statuses of the LEDs in the light source.
Figure 12B:
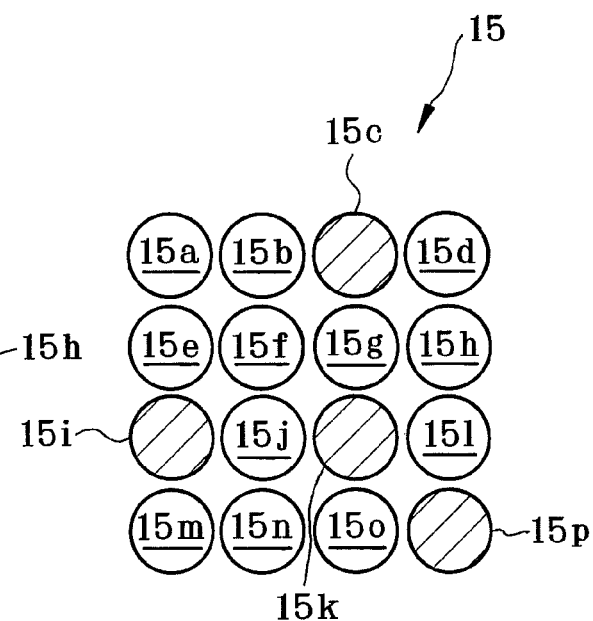
Figure 12C:
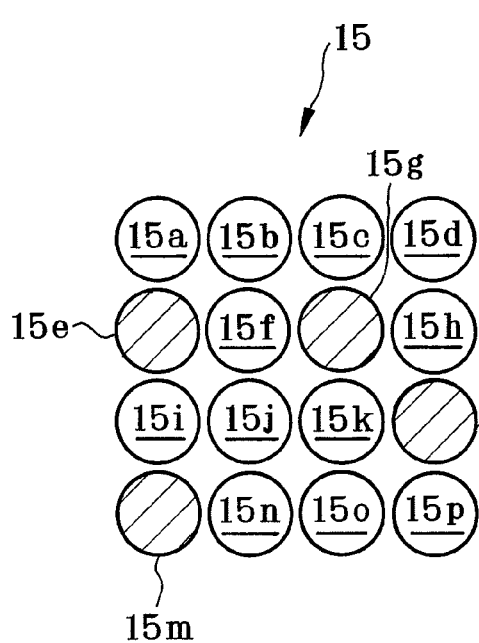
Figure 12D:
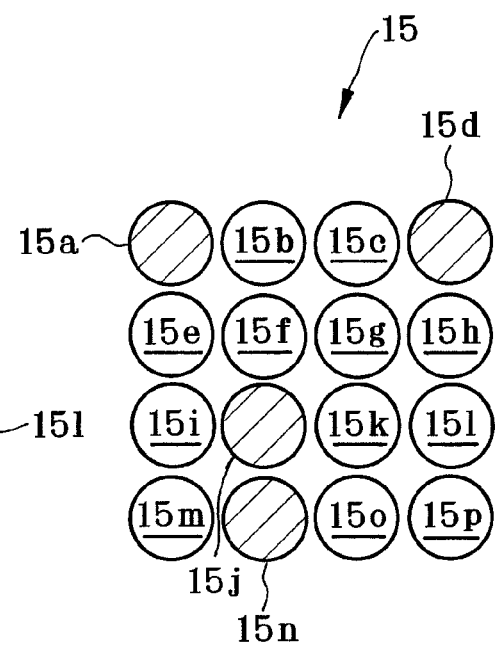

In FIG. 12A, a sum of the voltage values of the LEDs 15b, 15f, 15h and 15o is 14.6 volts as 3.5+3.6+3.7+3.8 volts according to the table. In FIG. 12B, a sum of the voltage values of the LEDs 15c, 15i, 15k and 15p is 14.6 volts. In FIG. 12C, a sum of the voltage values of the LEDs 15e, 15g, 15l and 15m is 14.6 volts. In FIG. 12D, a sum of the voltage values of the LEDs 15a, 15d, 15j and 15n is 14.6 volts. The LEDs 15a-15p are driven to illuminate by the four groups of FIGS. 12A-12D. Consequently, it is possible uniformly to emit light from the light source 15 by considering irregularity in the LEDs 15a-15p.

The illumination device 31 or assembly is incorporated in the camera body 12 according to the above embodiment, but may be secured to the camera body 12 in a removable manner. Also, an illumination device of the invention may be for use with a video camera or other optical instrument distinct from the digital still camera 11, and also can be a separate device for discrete use.

Various known techniques in the field of the LED matrix can be used in the invention, including a method of mounting elements on a board, producing method, electric or mechanical construction, electric connecting method, a method of power supply, and the like. Furthermore, an LED light source of the invention can include LEDs arranged in an array, polygonal form, concentric form, and any of other patterns in place of the matrix form of the LED matrix.

In the LED light source 15 or LED matrix of the above embodiment, the chips of the light emitting diodes (LEDs) 15a-15p emit blue light. The cover layer 43 includes phosphor of yellow color. However, the colors of the two components in the illumination device 31 or assembly are not limited. For example, the chips of the LEDs 15a-15p may emit blue light. In combination with this, the cover layer 43 may include phosphor of green or red color. Also, the chips of the LEDs 15a-15p may emit green light. In combination with this, the cover layer 43 may include phosphor of blue or red color.

Furthermore, a color of the light emitting diodes (LEDs) 15a-15p can be combined with a color of a cover in two or more combinations in the illumination device 31 or assembly. For example, a first light source unit can include an LED for emitting blue color, and a cover with phosphor of yellow color. A second light source unit can include an LED for emitting green color, and a cover with phosphor of red color. A third light source unit can include an LED for emitting red color, and a cover with phosphor of blue color. The light source can be a multi structure including the first, second and third light source units.

Also, a cap of a transparent and colored form may be fitted on the front of each of the LED chips or LEDs.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An illumination device comprising:
at least one light emitting diode for emitting illuminating light with an illuminating color changeable according to a first drive current applied thereto;
a memory for storing a first data table of a first correlation between intensity of said first drive current and said illuminating color and a second data table of a second correlation between the temperature of said light emitting diode and said illuminating color;
a temperature sensor for measuring temperature of said light emitting diode; and
an illumination control unit for controlling said first drive current according to said illuminating color by referring to said first and second data tables,
wherein said light emitting diode includes:
a light emitting diode chip for emitting light of a first color at intensity according to said first drive current; and
a cover for covering said light emitting diode chip, said cover having a phosphor component for emitting light of a second color by excitation with said light of said first color, wherein said illuminating color is defined according to a relative amount of said light of said first and second colors,
wherein said at least one light emitting diode is plural light emitting diodes, and
wherein based on said first data table, said illumination control unit sets a first group including a predetermined number of said plural light emitting diodes and a second drive current for said first group to determine a total light amount and said illuminating color, and based on the temperature measured by said temperature sensor and said second data table, said illumination control unit turns off said light emitting diodes in said first group when the temperature of said light emitting diodes in said first group reach a predetermined temperature after turned on, and supplies a third drive current having the same intensity as said second drive current for said first group to said light emitting diodes which are different from those in said first group and belongs to a second group including the same number of said light emitting diodes as said first group.

2. An illumination device as defined in claim 1, wherein said drive current is a pulse current, and said illumination control unit controls a duty cycle of said pulse current with an unchanged level of said pulse current, to change said light amount of said light emitting diode.

3. An illumination device as defined in claim 1,
wherein at least one of said first and second data table is associated with each one of temperature levels of said light emitting diode, and said illumination control unit selectively designates said data table according to said temperature measured by said temperature sensor.

4. An illumination device as defined in claim 1, further comprising a temperature control unit for controlling temperature of said light emitting diode to keep said illuminating color unchanged or to change said illuminating color.

5. An illumination device as defined in claim 1, wherein said illumination control unit controls a number of said light emitting diodes to be driven according to at least one of said first, second and third drive current determined for said illuminating color and a light amount of light to be used.

6. An illumination device as defined in claim 1, wherein said first and second data tables are associated with each one of said light emitting diodes, and said illumination control unit controls at least one of said first, second and third drive current of said light emitting diodes according to said first and second data table corresponding thereto.

7. An illumination device as defined in claim 1, further comprising:
a temperature control unit for controlling temperature of said light emitting diode according to said measured temperature, to keep said illuminating color unchanged or to change said illuminating color.

8. An illumination device as defined in claim 1, further comprising a plurality of temperature sensors for measuring temperature of respectively said light emitting diodes;
wherein said first and second data tables are associated with each one of temperature levels of said light emitting diodes, and said illumination control unit selectively designates said first and second data table according to said temperature measured by said temperature sensors, to control at least one of said first, second and third drive current discretely for said light emitting diodes.

9. An illumination device as defined in claim 1, further comprising:
a plurality of temperature sensors for measuring temperature of respectively said light emitting diodes;
a controller for interrupting emission of a first one of said light emitting diodes when temperature of said first light emitting diode becomes higher than a predetermined level, and for driving a second one of said light emitting diodes to illuminate.

10. The illumination device as defined in claim 1, wherein said plural light emitting diodes are classified into a plurality of groups such that sums of voltage values, raised when a predetermined drive current is applied, for said plural light emitting diodes in each of said plurality of groups are substantially equal to one another, and wherein said plural light emitting diodes are driven to illuminate by the groups.

11. An apparatus for image taking of an object, comprising:
at least one light emitting diode for emitting illuminating light toward said object with an illuminating color changeable according to a first drive current applied thereto;
a memory for storing a first data table of a first correlation between intensity of said first drive current and said illuminating color and a second data table of a second correlation between the temperature of said light emitting diode and said illuminating color;
a temperature sensor for measuring temperature of said light emitting diode; and;
a color temperature sensor for measuring color temperature of ambient light present around said object;
an illumination control unit for controlling said first drive current by referring to said first and second data tables according to color temperature of illuminating light determined by considering said color temperature of said ambient light,
wherein said light emitting diode includes:
a light emitting diode chip for emitting light of a first color at intensity according to said drive current; and
a cover for covering said light emitting diode chip, said cover having a phosphor component for emitting light of a second color by excitation with said light of said first color, wherein said illuminating color is defined according to a relative amount of said light of said first and second colors,
wherein said at least one light emitting diode is plural light emitting diodes, and
wherein based on said first data table, said illumination control unit sets a first group including a predetermined number of said plural light emitting diodes and a second drive current for said first group to determine a total light amount and said illuminating color, and based on the temperature measured by said temperature sensor and said second data table, said illumination control unit turns off said light emitting diodes in said first group when the temperature of said light emitting diodes in said first group reach a predetermined temperature after turned on, and supplies a third drive current having the same intensity as said second drive current for said first group to said light emitting diodes which are different from those in said first group and belongs to a second group including the same number of said light emitting diodes as said first group.

12. An apparatus for image taking as defined in claim 11 further comprising:
a controller for causing pre-emission of said light emitting diode and causing said light emitting diode to illuminate for image taking;
an exposure amount determiner for determining an optimized exposure amount during said pre-emission; and
a determiner for determining an exposure condition according to said optimized exposure amount.

13. An apparatus for image taking as defined in claim 12, wherein said exposure condition is constituted by at least one of ISO sensitivity, shutter speed, and aperture stop value.

14. An illumination method of illuminating an object with illuminating light;
said illuminating light being emitted by at least one light emitting diode for illumination with an illuminating color changeable according to a first drive current applied thereto, said illumination method comprising steps of:
determining said illuminating color of said illuminating light; and
controlling said drive current according to said illuminating color by referring to a first data table of a first correlation between said first drive current and said illuminating color and a second data table of a second correlation between the temperature of said light emitting diode and said illuminating color;
measuring temperature of said light emitting diode; and
wherein said light emitting diode includes:
a light emitting diode chip for emitting light of a first color at intensity according to said drive current; and
a cover for covering said light emitting diode chip, said cover having a phosphor component for emitting light of a second color by excitation with said light of said first color, wherein said illuminating color is defined according to a relative amount of said light of said first and second colors,
wherein said at least one light emitting diode is plural light emitting diodes, and
wherein based on said first data table, wherein in said controlling drive current step, a first group including a predetermined number of said plural light emitting diodes and a second drive current for said first group determines a total light amount and said illuminating color, and based on the temperature measured by said measuring temperature step and said second data table, said controlling drive current step turns off said light emitting diodes in said first group when the temperature of said light emitting diodes in said first group reach a predetermined temperature after turned on, and supplies a third drive current having the same intensity as said second drive current for said first group to said light emitting diodes which are different from those in said first group and belongs to a second group including the same number of said light emitting diodes as said first group.

15. An illumination method as defined in claim 14, wherein said drive current is a pulse current, and a duty cycle of said pulse current is controlled with an unchanged level of said pulse current, to change said light amount of said light emitting diode.

16. An illumination method as defined in claim 14, wherein a number of said light emitting diodes to be driven is controlled according to at least one of said first, second and third drive current determined for said illuminating color and a light amount of light to be used.

* * * * *